US012092176B2

(12) United States Patent
Singleton et al.

(10) Patent No.: US 12,092,176 B2
(45) Date of Patent: Sep. 17, 2024

(54) FRICTION PAD CARRIER FOR A DISC BRAKE

(71) Applicant: Bendix Commercial Vehicle Systems LLC, Avon, OH (US)

(72) Inventors: Kurt Singleton, Strongsville, OH (US); Luis Antonio Ayala Caballero, Monterrey (MX)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 148 days.

(21) Appl. No.: 17/681,103

(22) Filed: Feb. 25, 2022

(65) Prior Publication Data
US 2023/0272829 A1    Aug. 31, 2023

(51) Int. Cl.
| | | |
|---|---|---|
| *F16D 65/00* | (2006.01) | |
| *F16D 55/227* | (2006.01) | |
| *F16D 55/00* | (2006.01) | |

(52) U.S. Cl.
CPC ....... *F16D 65/0056* (2013.01); *F16D 55/227* (2013.01); *F16D 2055/0008* (2013.01); *F16D 2200/0013* (2013.01); *F16D 2200/0021* (2013.01); *F16D 2250/0084* (2013.01)

(58) Field of Classification Search
CPC ..... F16D 2055/0008; F16D 2055/0016; F16D 55/227; F16D 65/0056; F16D 2200/0013; F16D 2200/0021; F16D 65/0084; F16D 65/0087; F16D 2055/0025
See application file for complete search history.

(56) References Cited

U.S. PATENT DOCUMENTS

| | | | | |
|---|---|---|---|---|
| 6,068,091 A | * | 5/2000 | Finley | B60T 1/065 188/73.31 |
| 7,673,723 B2 | | 3/2010 | Paul et al. | |
| 9,447,828 B2 | * | 9/2016 | Morris | F16D 55/02 |
| 9,447,829 B2 | | 9/2016 | Bull et al. | |
| 10,605,317 B2 | | 3/2020 | Knoop | |
| 2006/0237267 A1 | * | 10/2006 | Brown, II | F16D 55/226 188/73.31 |

(Continued)

FOREIGN PATENT DOCUMENTS

EP    1437521 B1    1/2007

OTHER PUBLICATIONS

English (machine) translation of EP 1437521 B1.

*Primary Examiner* — Robert A. Siconolfi
*Assistant Examiner* — Mahbubur Rashid
(74) *Attorney, Agent, or Firm* — Reising Ethington P.C.

(57) ABSTRACT

A friction pad carrier for a vehicle disc brake includes a frame having an aperture through which a portion of a rotor rotating about a rotational axis extends. The frame mounts friction pads on opposite sides of the rotor. The frame includes lugs proximate each end that receive fasteners coupling the frame to an anchor plate mounted on an axle of the vehicle. The fasteners permit some amount of surge movement and sway movement between the frame and the anchor plate in a plane at the interface between the frame and the anchor plate and yaw movement about an axis perpendicular to the plane. A first alignment pin between one of the lugs and the anchor plate inhibits the amount of surge movement and sway movement and a second alignment pin between one of the lugs and the anchor plate inhibits the amount of yaw movement.

15 Claims, 6 Drawing Sheets

(56) References Cited

U.S. PATENT DOCUMENTS

| | | | | |
|---|---|---|---|---|
| 2008/0067015 A1* | 3/2008 | Thomas | ............... | F16D 55/00 |
| | | | | 188/73.31 |
| 2008/0135352 A1* | 6/2008 | Bell | ............ | F16D 55/22 |
| | | | | 188/73.39 |
| 2014/0027214 A1* | 1/2014 | Morris | ............... | F16D 55/22 |
| | | | | 188/73.31 |
| 2014/0034431 A1* | 2/2014 | Chung | ............. | F16D 65/0075 |
| | | | | 188/73.31 |

\* cited by examiner

FRICTION PAD CARRIER FOR A DISC BRAKE

BACKGROUND OF THE INVENTION a. Field of the Invention

This invention relates to disc brakes. In particular, the invention relates to a friction pad carrier for a disc brake that is configured to inhibit movement of the carrier relative to an anchor plate to which the carrier is coupled.

b. Background Art

A conventional vehicle disc brake includes a friction pad carrier and a caliper. The friction pad carrier supports a pair of friction pads on opposite sides of a rotor or brake disc that rotates with a vehicle wheel. The caliper is supported on the carrier and configured for movement relative to the carrier along a pair of guide pins to cause the friction pads to engage with, and disengage from, the rotor. The disc brake is mounted on the vehicle by coupling the friction pad carrier to an anchor plate mounted on an axle supporting the vehicle wheel. In particular, one or more fasteners extend through aligned bores in corresponding lugs on the anchor plate and the carrier to couple the carrier to the anchor plate. Although the fasteners couple the carrier to the anchor plate and prevent separation of the carrier and anchor plate, the fasteners permit the carrier to move relative to anchor plate in various directions. Relative movement may occur, for example, as a result of deformation of the carrier and/or when the shear force transferred from the friction pads through the interface between the carrier and anchor plate exceeds the static friction force at the interface. Movement of the carrier relative to the anchor plate can create misalignment of the guide pins on which the caliper moves and negatively impact the performance of the brake.

The inventors herein have recognized a need for a friction pad carrier for a disc brake that will minimize and/or eliminate one or more of the above-identified deficiencies.

BRIEF SUMMARY OF THE INVENTION

This invention relates to disc brakes. In particular, the invention relates to a friction pad carrier for a disc brake that is configured to inhibit movement of the carrier relative to an anchor plate to which the carrier is coupled.

A friction pad carrier for a disc brake for a vehicle in accordance with one embodiment includes a frame defining a central aperture configured to receive an arcuate portion of a rotor that is configured for rotation about a rotational axis. The frame is configured for mounting first and second friction pads on opposite sides of the rotor. The frame further defines a first lug proximate one end of the frame and defining a first fastener bore, the first fastener bore configured for alignment with a corresponding first fastener bore in an anchor plate mounted on an axle of the vehicle and configured to receive a first fastener for coupling the frame to the anchor plate at a first interface disposed within a plane. The frame further defines a second lug proximate another end of the frame and defining a second fastener bore, the second fastener bore configured for alignment with a corresponding second fastener bore in the anchor plate and configured to receive a second fastener for coupling the frame to the anchor plate at a second interface disposed within the plane. The first fastener and the second fastener permit an amount of surge movement between the frame and the anchor plate within the plane in a direction parallel to the rotational axis, an amount of sway movement between the frame and the anchor plate within the plane in a direction perpendicular to the surge movement and an amount of yaw movement about an axis perpendicular to the plane. The first lug further defines a first alignment pin bore configured for alignment with a corresponding first alignment pin bore in the anchor plate and configured to receive a first alignment pin inhibiting the amount of surge movement and the amount of sway movement. One of the first lug and the second lug defines a second alignment pin bore configured for alignment with a corresponding second alignment pin bore in the anchor plate and configured to receive a second alignment inhibiting the amount of yaw movement.

A disc brake for a vehicle in accordance with one embodiment includes a friction pad carrier comprising a frame defining a central aperture configured to receive an arcuate portion of a rotor that is configured for rotation about a rotational axis. The frame is further configured for mounting first and second friction pads on opposite sides of the rotor. The frame further defines a first lug proximate one end of the frame and defining a first fastener bore, the first fastener bore configured for alignment with a corresponding first fastener bore in an anchor plate mounted on an axle of the vehicle and configured to receive a first fastener for coupling the frame to the anchor plate at a first interface disposed within a plane. The frame further defines a second lug proximate another end of the frame and defining a second fastener bore, the second fastener bore configured for alignment with a corresponding second fastener bore in the anchor plate and configured to receive a second fastener for coupling the frame to the anchor plate at a second interface disposed within the plane. The first fastener and the second fastener permit an amount of surge movement between the frame and the anchor plate within the plane in a direction parallel to the rotational axis, an amount of sway movement between the frame and the anchor plate within the plane in a direction perpendicular to the surge movement and an amount of yaw movement about an axis perpendicular to the plane. The first lug further defines a first alignment pin bore configured for alignment with a corresponding first alignment pin bore in the anchor plate and configured to receive a first alignment pin inhibiting the amount of surge movement and the amount of sway movement. One of the first lug and the second lug defines a second alignment pin bore configured for alignment with a corresponding second alignment pin bore in the anchor plate and configured to receive a second alignment inhibiting the amount of yaw movement. The disc brake further includes a caliper coupled to the friction pad carrier and configured for movement relative to the friction pad carrier to urge the first friction pad and the second friction pad into engagement with the rotor.

A disc brake assembly for a vehicle in accordance with one embodiment includes an anchor plate configured for mounting to an axle of the vehicle. The anchor plate defines an aperture through which the axle extends. The assembly further includes a friction pad carrier coupled to the anchor plate. The friction pad carrier comprises a frame defining a central aperture configured to receive an arcuate portion of a rotor that is configured for rotation about a rotational axis. The frame is further configured for mounting first and second friction pads on opposite sides of the rotor. The frame defines a first lug proximate one end of the frame and defining a first fastener bore, the first fastener bore configured for alignment with a corresponding first fastener bore in the anchor plate and configured to receive a first fastener for coupling the frame to the anchor plate at a first interface disposed within a plane. The frame further defines a second lug proximate another end of the frame and defining a second fastener bore, the second fastener bore configured for alignment with a corresponding second fastener bore in the anchor plate and configured to receive a second fastener for coupling the frame to the anchor plate at a second interface disposed within the plane. The first fastener and the second fastener permit an amount of surge movement between the frame and the anchor plate within the plane in a direction parallel to the rotational axis, an amount of sway movement between the frame and the anchor plate within the plane in a direction perpendicular to the surge movement and an amount of yaw movement about an axis perpendicular to the plane. The first lug further defines a first alignment pin bore configured for alignment with a corresponding first alignment pin bore in the anchor plate and configured to receive a first alignment pin inhibiting the amount of surge movement and the amount of sway movement. One of the first lug and the second lug defines a second alignment pin bore configured for alignment with a corresponding second alignment pin bore in the anchor plate and configured to receive a second alignment inhibiting the amount of yaw movement. The assembly further includes a caliper coupled to the friction pad carrier and configured for movement relative to the friction pad carrier to urge the first friction pad and the second friction pad into engagement with the rotor.

A friction pad carrier for a disc brake for a vehicle in accordance with the invention represents an improvement as compared to conventional friction pad carriers. In particular, the carrier facilitates the use of alignment pins for aligning the carrier relative to the anchor plate and inhibiting relative movement of the carrier and the anchor plate. By inhibiting relative movement between the carrier and the anchor plate, the alignment of the guide pins on which the caliper moves is maintained thereby inhibiting degradation in the performance of the brake and potentially reducing maintenance costs. The carrier configuration and alignment pins also help to facilitate assembly of the brake onto the anchor plate and and may also allow for a reduction in the number, size or required strength of the fasteners joining the carrier and anchor plate.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
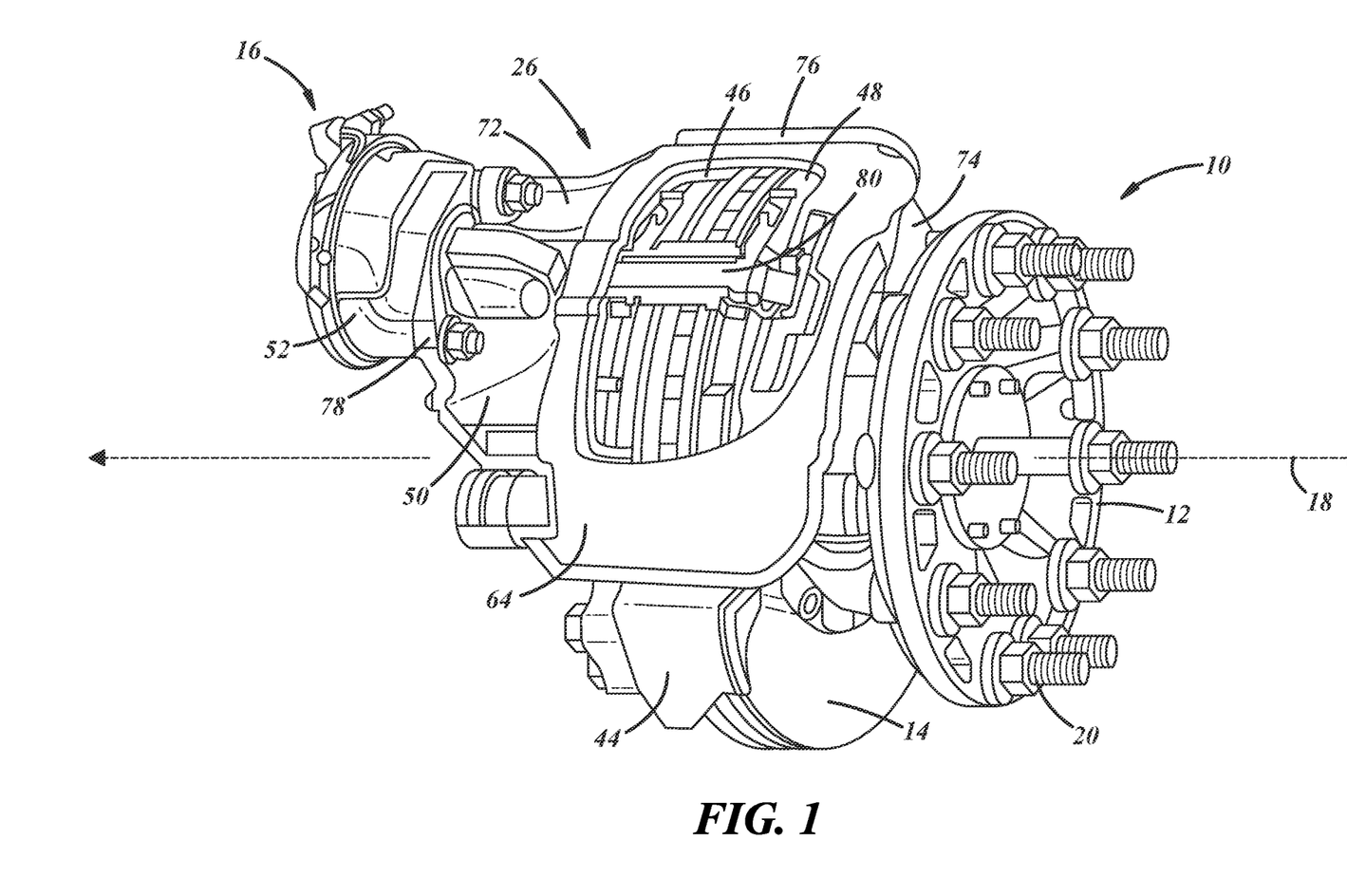
FIG. 1 is a perspective view of a disc brake assembly in accordance with one embodiment of the present teachings mounted on a vehicle wheel end assembly.
Figure 2:
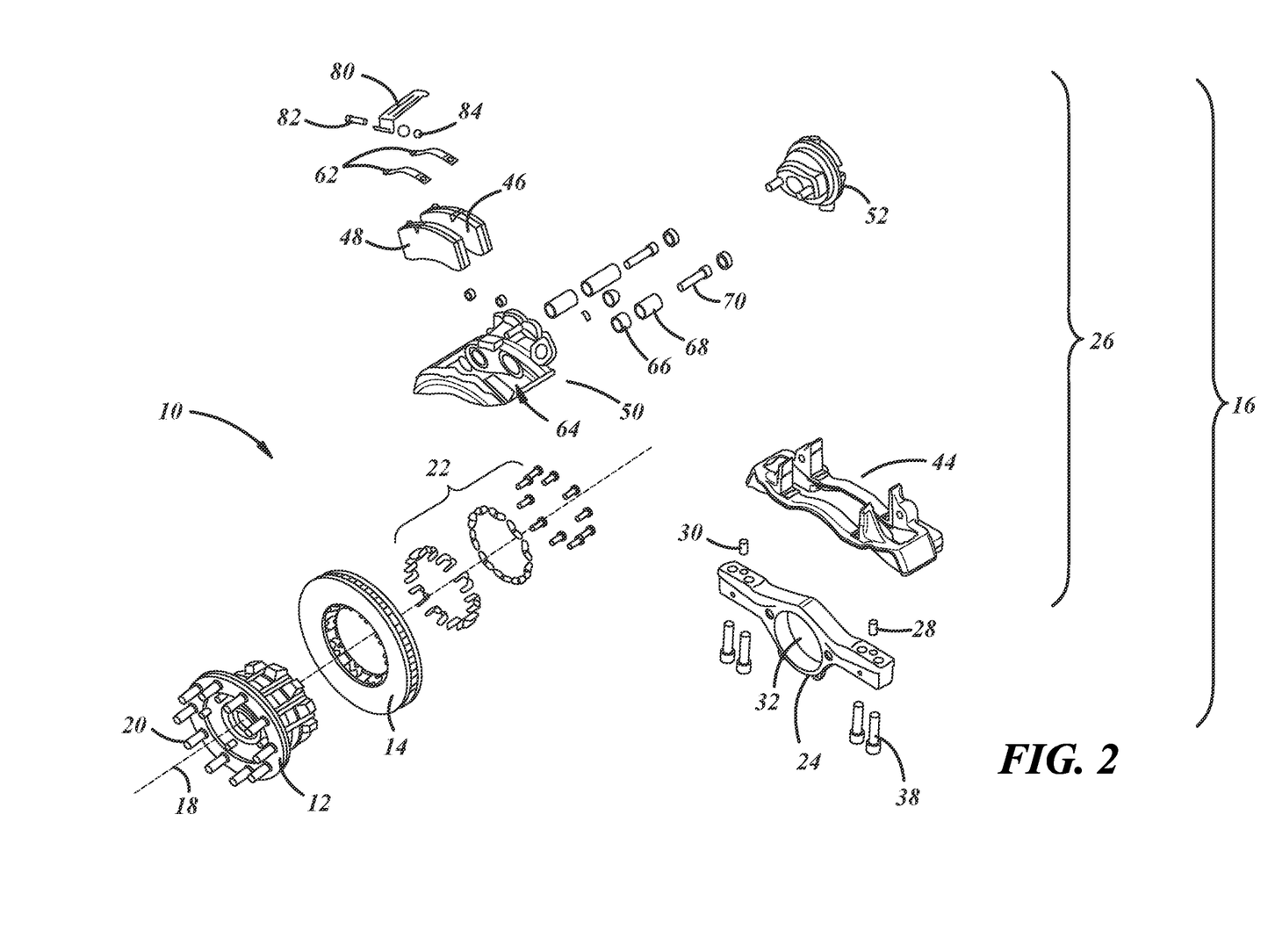
FIG. 2 is an exploded perspective view of the wheel end assembly and disc brake assembly shown in FIG. 1.

Referring now to the drawings wherein like reference numerals are used to identify identical components in the various views, FIGS. 1-2 illustrate a wheel end assembly 10 incorporating a disc brake assembly in accordance with one embodiment of the present teachings. Assembly 10 is particularly configured for use on heavy commercial vehicles such as trucks, trailers and buses, but it should be understood that assembly 10 may find application on a wide variety of vehicles. Assembly 10 may include a wheel hub 12, a rotor 14 and a disc brake assembly 16 in accordance with the present teachings.

Wheel hub 12 is provided for mounting a vehicle wheel on an axle of the vehicle. In the illustrated embodiment, hub 12 is configured for use with a steer axle of the vehicle. It should be understood, however, that hub 12 may alternatively be configured for use with a drive axle or trailer axle. Hub 12 may define a central bore configured to receive a stub axle and bearings that allow hub 12 to rotate relative to the axle about an axis 18. Hub 12 also includes a plurality of outwardly extending bolts 20 on which the wheel may be mounted for rotation with hub 12.

Rotor 14 works together with disc brake assembly 16 to establish a braking torque in a vehicle wheel in order to slow or stop rotation of the wheel and movement of the vehicle. Rotor 14 may be made from a variety of metals and metal alloys including iron. Rotor 14 is annular in shape and configured for mounting on wheel hub 12. Rotor 14 may be secured to hub 12 using conventional fasteners. Alternatively, as shown in FIG. 2, rotor 14 may define a plurality of splines in a radially inner perimeter configured to engage mating splines on a radially outer mounting surface of hub 12. Additional hardware 22 including spacers and fasteners may be used to maintain the position of rotor 14 on hub 12. Rotor 14 transmits a braking torque to hub 12 which in turn transmits the torque to the vehicle wheel. Rotor 14 may include a pair of braking discs connected by webs to increase the surface area of the rotor for use in dissipating heat from the rotor generated during braking into the air and thereby minimize heat distortion and optimize thermal stress endurance.

Disc brake assembly 16 is provided to apply a braking torque to rotor 14 in order to slow or halt rotation of one or more vehicle wheels. Disc brake assembly 16 is particularly adapted for use on heavy vehicles and may be used with wheels mounted on drive axles, steer axles or trailer axles. It should be understood, however, that assembly 16 could be used on a wide variety of vehicles and in non-vehicular applications. In accordance with the present teachings, assembly 16 includes an anchor plate (or torque plate) 24 (FIG. 2), a disc brake 26 (FIGS. 1-2), and a pair of alignment pins 28, 30 (FIG. 2).

Figure 3:
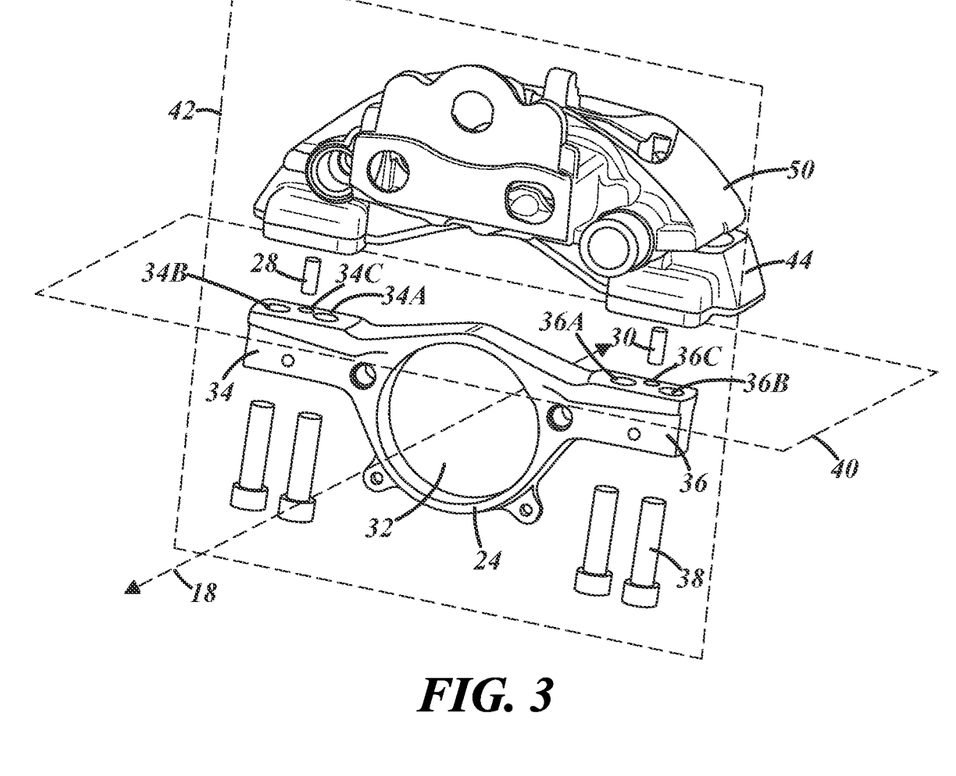
FIG. 3 is an exploded perspective view of a portion of the disc brake assembly of FIGS. 1-2.
Figure 4:
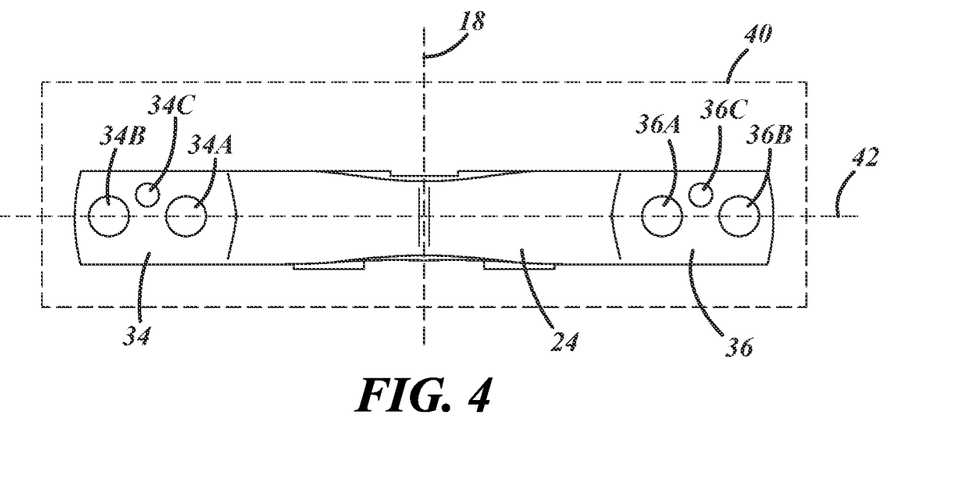
FIG. 4 is a plan view of an anchor plate of the disc brake assembly of FIGS. 1-2.
Figure 5:
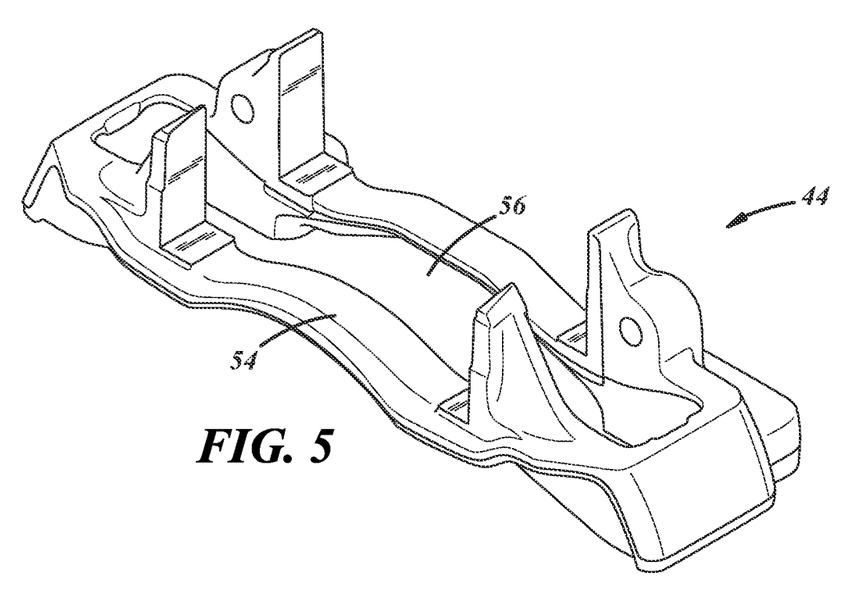
FIGS. 5-6 are perspective views of a friction pad carrier of the disc brake assembly of FIGS. 1-2.
Figure 6:
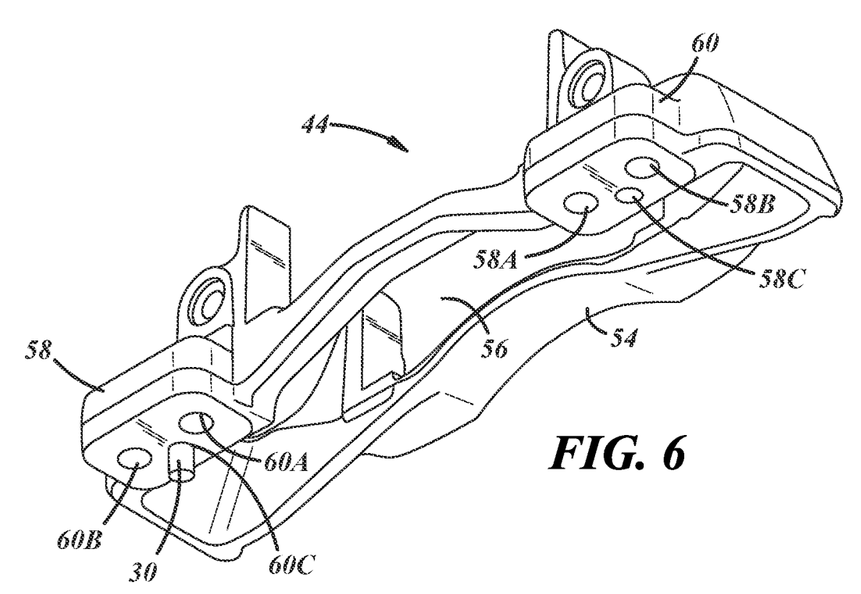
Figure 7:
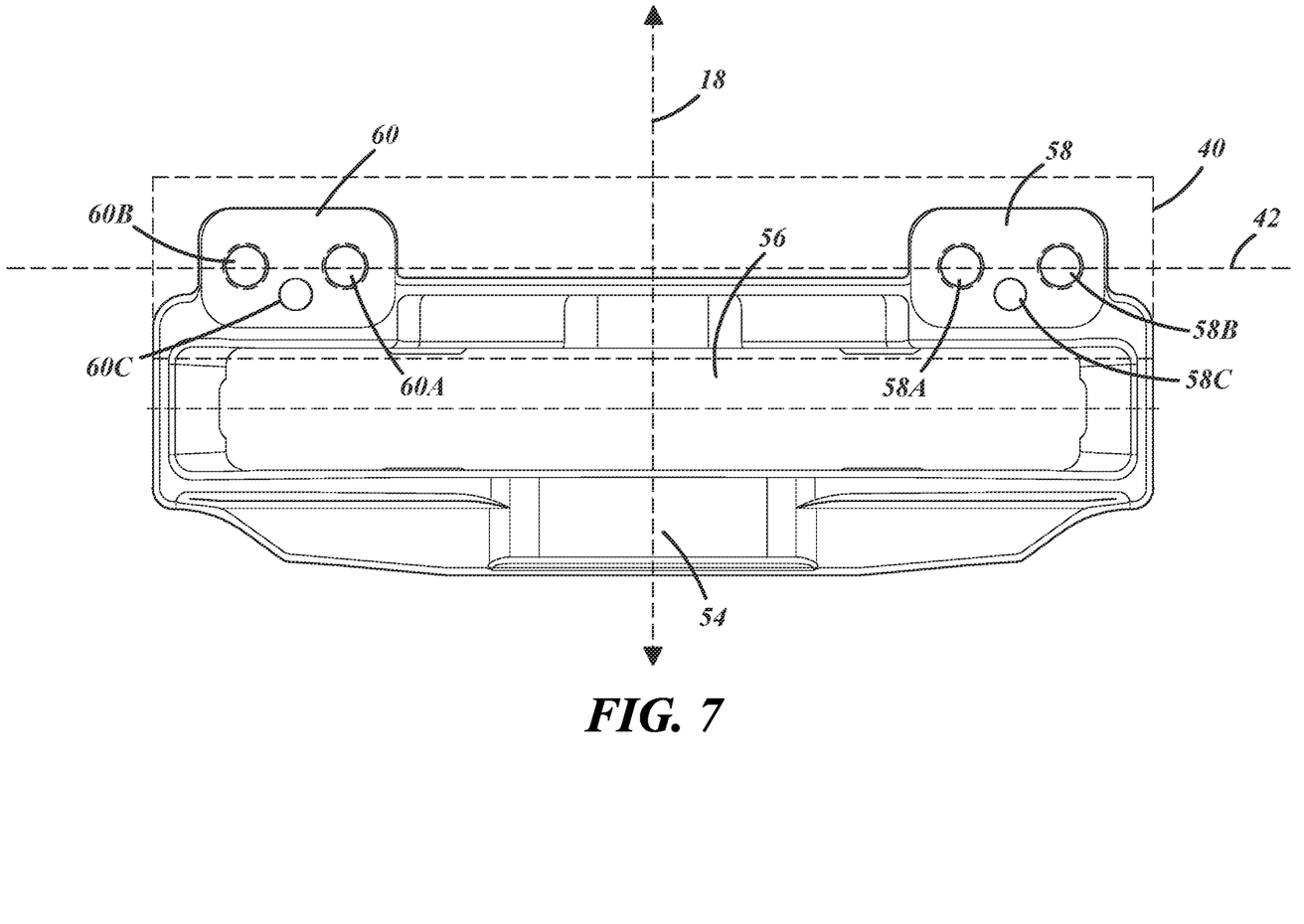
FIG. 7 is a plan view of a friction pad carrier of the disc brake assembly of FIGS. 1-2.
Figure 8:
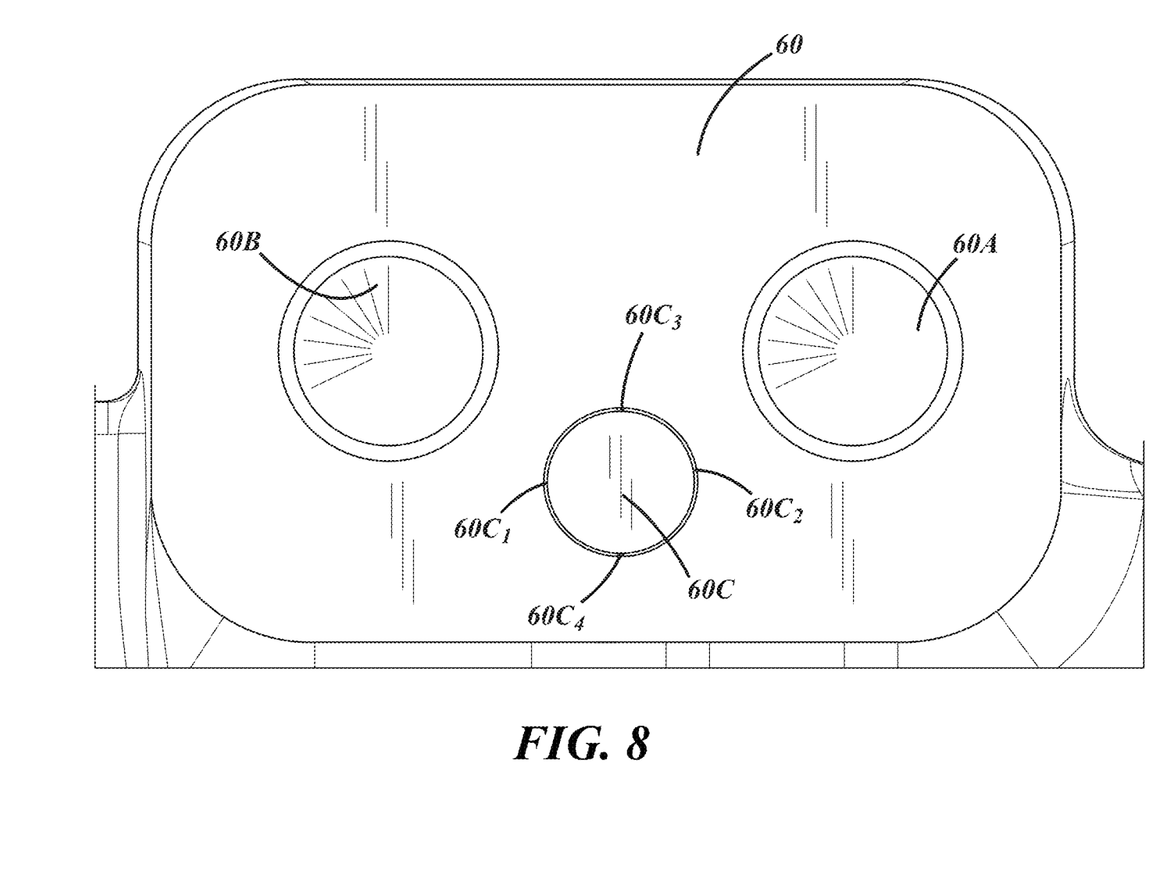
FIG. 8 is an enlarged, plan view of a portion of the friction pad carrier of FIG. 7.

Referring to FIGS. 2-4, anchor plate 24 is provided for mounting disc brake 26 to the vehicle. Anchor plate 24 defines a central aperture 32 through which the vehicle axle may extend. Referring to FIGS. 3-4, plate 24 further defines mounting lugs 34, 36 configured to support brake 26. Each lug 34, 36 defines one or more fastener bores 34A, 34B and 36A, 36B through which fasteners 38 extend to couple brake 26 to anchor plate 24 at an interface disposed with a plane 40 distant from, and parallel to, axis 18. In one embodiment, fasteners 38 may comprise class 10.9 fasteners under International Organization for Standardization (ISO) Standard 898-1. In the illustrated embodiment, fasteners 38 extend substantially perpendicular to the axis of rotation 18 of wheel hub 12 and rotor 14. In an alternative embodiment, anchor plate 24 is configured such that fasteners 38 extend parallel to the axis of rotation 18 (and plane 40 is perpendicular to axis 18). Although each lug 34, 36 includes two fastener bores 34A, 34B and 36A, 36B, it should be understood that the number of fastener bores and corresponding fasteners 38 may vary. Further, although bores 34A, 34B and bores 36A, 36B are arranged such that the center axes of bores 34A, 34B, 36A, 36B are in a common plane 42 extending perpendicular to axis 18 and plane 40, it should be understood that arrangement and relative positioning of bores 34A, 34B, 36A, 36B may vary. In accordance with the present teachings, lugs 34, 36 further define alignment pin bores 34C, 36C configured to receive one end of a corresponding alignment pin 28, 30. The diameter of bore 34C is slightly greater than the diameter of alignment pin 28 such that pin 28 is slip fit within bore 34C. The diameter of bore 36C is equal to or slightly less than the diameter of alignment pin 30 such that pin 30 is press fit within bore 36C. In the illustrated embodiment, each lug 34, 36 includes an alignment pin bore 34C, 36C, respectively. In an alternative embodiment, however, one of lugs 34, 36 could include both alignment pin bores 34C, 36C. In the illustrated embodiment, alignment pin bores 34C, 36C are disposed between fastener bores 34A, 34B and 36A, 36B, respectively, such that a center axis of each of alignment pin bore 34C, 36C is disposed further from axis 18 than the center axis of one of the corresponding bores 34A, 36A, but nearer to axis 18 than the center axis of the other of the corresponding bores 34B, 36B. Further, the center axes of alignment pin bores 34C, 36C are disposed a side of plane 42 nearer to disc 14. It should be understood, however, that the relative positions of alignment pin bores 34C, 36C relative to fastener bores 34A, 34B, 36A, 36B may vary.

Referring again to FIGS. 1-2, disc brake 26 is provided to selectively apply a braking torque to rotor 14 in order to brake rotation of wheel hub 12 and the vehicle wheel. Brake 26 includes a friction pad carrier 44 in accordance with the present teachings, friction pads 46, 48, a caliper 50, and an actuator 52.

Carrier 44 is provided to support friction pads 46, 48. Carrier 44 also absorbs circumferential loads during actuation of brake 26 and transfers those loads to the axle through anchor plate 24. Referring to FIGS. 5-8, carrier 44 includes a body or frame 54 that defines a central aperture 56 configured to receive an arcuate portion of rotor 14. Frame 54 is further configured to mount friction pads 46, 48 on opposite (inboard and outboard) sides of rotor 14. Frame 54 further defines mounting lugs 58, 60 proximate either end of frame 54 corresponding to mounting lugs 34, 36 on anchor plate 24. Each of lugs 58, 60 may define one or more fastener bores 58A, 58B and 60A, 60B into which fasteners 38 extend to couple brake 26 to anchor plate 24 at an interface disposed with plane 40. Although each lug 58, 60 includes two fastener bores 58A, 58B and 60A, 60B, it should again be understood that the number of fastener bores and corresponding fasteners 38 may vary. Further, although bores 58A, 58B and bores 60A, 60B are arranged such that the center axes of bores 58A, 58B, 60A, 60B are all within a common plane 42 (see FIG. 7) extending perpendicular to axis 18 and plane 40, it should be understood that arrangement and relative positioning of bores 58A, 58B, 60A, 60B may vary. In accordance with the present teachings, lugs 58, 60 may further define alignment pin bores 58C, 60C configured for alignment with corresponding alignment pin bores 34C, 36C in anchor plate 24 and configured to receive one end of a corresponding alignment pin 28, 30. In accordance with one aspect of the present teachings, the diameter of alignment pin bores 58C, 60C may vary. In particular, the diameter of bore 60C may be greater than the diameter of bore 58C. Further, while bore 58C may be circular in shape, bore 60C may comprise a slotted bore (i.e., referring to FIG. 8, a bore in which two curved portions $60C_1$, $60C_2$ are connected by two flat portions $60C_3$, $60C_4$) to prevent rotation of pin 30 within bore 60C. The diameter of bore 58C may equal to or slightly less than the diameter of pin 28 such that the pin 28 is press fit within bore 58C. In the illustrated embodiment, each lug 58, 60 includes an alignment pin bore 58C, 60C, respectively. As discussed above, however, in an alternative embodiment one of lugs 58, 60 could include both alignment pin bores 58C, 60C. In the illustrated embodiment, alignment pin bores 58C, 60C are disposed between fastener bores 58A, 58B and 60A, 60B, respectively, such that the center axes of alignment pin bores 58C, 60C are disposed further from axis 18 than the center axes of corresponding ones of fastener bores 58A, 60A, but nearer to axis 18 than the center axes of the corresponding ones of the other fastener bores 58B, 60B. Further, the center axes of alignment pin bores 58C, 60C are disposed on one side of plane 42 nearer to disc 14. It should again be understood, however, that the relative positions of alignment pin bores 58C, 60C relative to fastener bores 58A, 58B, 60A, 60B may vary.

Referring again to FIG. 2, friction pads 46, 48 are provided to generate friction during engagement with rotor 14 in order to slow the rotation of rotor 14 and, ultimately, the vehicle wheel. Friction pads 46, 48 are supported on carrier 44 with friction pad 46 disposed on an inboards side of rotor 14 and friction pad 48 disposed on an outboard side of rotor 14. Each friction pad 46, 48 may include a friction material configured to engage rotor 14, a backing plate that supports the friction material and is engaged by an actuating mechanism of the brake and a bonding material that couples the friction material to the backing plate. Pads 46, 48 may be retained on carrier 44 using springs 62.

Caliper 50 is provided urge friction pads 46, 48 into engagement with rotor 14 in response to movement of actuator 52. Caliper 50 includes a body 64 and means, such as bushings 66, guide pins 68, and bolts 70 for coupling caliper 50 to carrier 44 and permitting movement of caliper 50 relative to carrier 44. Caliper 50 also includes means, such as a piston (not shown) for urging inboard friction pad 46 towards the inboard side of rotor 14, and means, such as lever (not shown) for causing movement of the piston and body 64 in response to movement of actuator 52. Caliper 50 may further include means (not shown) for adjusting the position of caliper 50 relative to carrier 44 in order to compensate for wear of friction materials and maintain brake stroke. Caliper 50 may also include wear sensors (not shown) that generate electronic signals indicative of the condition of rotor 14 and/or friction pads 46, 48.

Body 64 provides structural support for the other components of caliper 50 and protects those components from foreign objects and elements. Body 64 also provides a means for urging outboard friction pad 48 against the outboard side of rotor 14. Body 64 may comprise a unitary (single piece) structure as opposed to a multiple piece structure in which the pieces are connected by fasteners or other means. Referring to FIG. 1, body 64 may include an actuator portion 72, a reaction portion 74, and one or more bridge portions 76 connecting portions 72, 74. Actuator portion 72 houses the piston, lever and other components used to urge friction pads 46, 48 against rotor 14. Actuator portion 72 is configured to be disposed on an inboard side of rotor 14. Actuator portion 72 defines a mounting flange 78 configured to support brake actuator 52. Reaction portion 74 is provided to urge outboard friction pad 46 towards the outboard side of rotor 14 and into engagement with the outboard side of rotor 14 in response to movement of the lever by actuator 52 during actuation of brake 26. Reaction portion 74 is configured to be disposed on an outboard side of rotor 14. Referring to FIGS. 1-2, reaction portion 74 may support a friction pad retainer 80 that extends from reaction portion 74 to actuator portion 72 and is disposed radially outwardly of rotor 14 and friction pads 46, 48. Referring to FIG. 2, retainer 80 may be secured to reaction portion 74 by a pin 82 and spring clip 84 or other suitable means for maintaining retainer 80 in a closed position. Retainer 80 may be moved to an open position or removed when access to friction pads 46, 48 is required during maintenance. Bridge portions 76 are provided to connect actuator portion 72 and reaction portion 74. Bridge portions 76 extend between the actuator portion 72 and the reaction portion 74 and are configured to be disposed radially outward rotor 14.

Referring again to FIG. 2, bushings 66, guide pins 68 and bolts 70 provide a means for coupling caliper 50 to carrier 44 and permitting movement of caliper 50 relative to carrier 44. Actuator portion 72 of body 64 defines bores (not shown) that are aligned with carrier 44 in a direction parallel to rotational axis 18 and that are configured to receive bushings 66, pins 68 and bolts 70 therein. Pins 68 extend through the bores and engage a face of carrier 44 which is shaped to receive one longitudinal end of each pin 68. Each pin 68 has a counterbored hole that aligns with a corresponding bore in carrier 44 and bolts 70 are inserted into the counterbored holes and the aligned bores in carrier 44 to secure pins 68 against carrier 70. Bushings 66 are disposed about pins 68 within the bores in actuator portion 72 of caliper body 64 and allow body 64 to move relative to carrier 44 in a direction parallel to axis 18. As discussed above, in conventional disc brakes movement of carrier 44 relative to anchor plate 24 due to, for example, deformation of carrier 44 and/or when the shear force transferred from friction pads 46, 48 through the interface between carrier 44 and anchor plate 24 exceeds the static friction force at the interface, can create misalignment of the pins 68 and negatively impact the performance of the brake.

Actuator 52 is provided to control actuation of brake 26. In the illustrated embodiment, actuator 52 comprises a pneumatic service actuator. It should be understood, however, that actuator 52 may take on a variety of forms including actuators that are configured to operate brake 26 as both a parking and service brake. Actuator 52 may include a pushrod (not shown) that extends from actuator 52 into actuator portion 72 of caliper 50 and engages t the lever in actuator portion 72. The pushrod is moved between a released position and an applied under forces exerted by springs and pneumatic pressure in actuator 52. Movement of the pushrod to an applied position causes corresponding movement of the lever and the piston housed within actuator portion 72 of body 64 of caliper 50. In particular, movement of the pushrod causes movement of the lever which in turn causes the piston to move in one direction, outward from actuator portion 72 of caliper body 64, to urge the inboard friction pad 46 towards engagement with the inboard side of rotor 14. The same movement of the lever causes caliper body 64 to move in another direction—opposite the direction of movement of the piston—to bring reaction portion 74 of body 64 into engagement with outboard friction pad 48 and forces friction pad 48 against the outboard side of rotor 14.

Alignment pins 28, 30 provide a means for inhibiting movement of carrier 44 relative to anchor plate 24. Pin 28, 30 also act as load bearing pins that absorb shear forces exceeding the static friction at the interface between carrier 44 and anchor plate 24. Pins 28, 30 also orient the position of carrier 44 relative to rotor 14. As discussed hereinabove, although fasteners 38 couple carrier 44 to anchor plate 24 and prevent separation of carrier 44 and anchor plate 24, fasteners 38 do permit some degree of movement of carrier 44 relative to anchor plate 24 in various directions. For example, and with reference to FIG. 3, fasteners 38 permit an amount of surge (back and forth) movement between frame 54 of carrier 44 and anchor plate 24 within plane 40 in a direction parallel to axis 18. Fasteners 38 also permit an amount of sway (side to side) movement between frame 54 and anchor plate 24 within plane 40 in a direction perpendicular to the surge movement. Fasteners 38 also permit an amount of yaw movement about an axis perpendicular to plane 40. Relative movement between frame 54 of carrier 44 and anchor plate 24 may occur, for example, as a result of deformation of carrier 44 and/or when the shear force transferred from friction pads 46, 48 through the interface between carrier 44 and anchor plate 24 exceeds the static friction force at the interface. This movement can create misalignment of guide pins 68 on which caliper 50 moves and negatively impact the performance of the brake.

Alignment pins 28, 30 may be made from various metals and metal alloys including aluminum or steel. In one constructed embodiment, pins 28, 30 are formed from a carbon steel, and in particular, AISI (American Iron and Steel Institute) 1144 steel. In the illustrated embodiment, pins 28, 30 are identical in shape and circular in cross-section. It should be understood, however, that the pins 28, 30 may assume different shapes and be different from one another. The diameter of pins 28, 30 may be equal to or greater than the diameter of the corresponding alignment pin bores 58C, 36C in carrier 44 and anchor plate 24 such that pins 28, 30 engage carrier 44 and anchor plate 24, respectively, in an interference fit. Although pins 28, 30 engage carrier 44 and anchor plate 24, respectively, in an interference fit in the illustrated embodiment, it should be understood that the relative sizing and arrangement of bores 34C and 58C and the relative sizing and arrangement of bores 36C and 60C could be reversed such that, for example, both of pins 28, 30 engage either the anchor plate 24 or carrier 44 in an interference fit and engage the other of anchor plate 24 and carrier 44 in a slip fit. In one constructed embodiment, pins 28, 30 are about 1.2 inches long and have a diameter of about 0.5 inches.

A method of assembling disc brake assembly 16 may begin with the step of inserting (press-fitting) pins 28, 30 into bores 58C, 36C in carrier 44 and anchor plate 24. Where anchor plate 24 and brake 26 are separately manufactured, anchor plate 24 and carrier 44 may be provided with pins 30, 28, respectively, pre-inserted into anchor plate 24 and carrier 44. The method may continue with the step of aligning carrier 44 relative to anchor plate 24 such that the alignment pins 30, 28, extending from anchor plate 24 and carrier 44 are aligned with corresponding alignment pin bores 60C, 34C in carrier 44 and anchor plate 24, respectively. This action will also align fastener bores 34A, 34B, 36A, 36B in anchor plate 24 with corresponding fasteners bores 58A, 58B, 60A, 60B in carrier 44 thereby insuring correct alignment of the fastener bores prior to insertion of fasteners 38. The method may continue with the step of moving one of anchor plate 24 and carrier 44 towards the other of anchor plate 24 and carrier 44 and inserting pins 28, 30 in to the corresponding alignment pin bores 34C, 60C in anchor plate 24 and carrier 44. Pin 28 is received within alignment pin bore 34C in anchor plate 24 with a slip-fit arrangement. Pin 30 is received within alignment pin bore 60C in carrier 44 in a manner that prevents relative rotation of pin 30 and carrier #(e.g., through formation of bore 60C as a slotted bore). The method may conclude with the step of inserting fasteners 38 through the aligned fasteners bores 34A, 34B, 36A, 36B and 58A, 58B, 60A, 60B in anchor plate 24 and carrier 44.

Upon assembly of carrier 44 to anchor plate 24, alignment pins 28, 30, inhibit movement of carrier 44 relative to anchor plate 24 in three degrees of freedom. Pin 28 inhibits the amount of surge (back and forth) movement within plane 40 in a direction parallel to axis 18 as well as the amount of sway (side to side) movement within plane 40 in a direction perpendicular to axis 18. Pin 30, which is disposed in a slotted bore 60C in carrier 44, inhibits the amount of yaw movement about a yaw axis perpendicular to plane 40. Because pins 28, 30 limit movement of carrier 44 relative to anchor plate 24, the alignment of guide pins 68 is maintained even when shear forces transferred from friction pads 46, 48 through the interface between carrier 44 and anchor plate 24 exceed the static friction force at the interface. As a result, consistent performance of the brake 26 is maintained and maintenance costs may be reduced.

A friction pad carrier 44 for a disc brake 26 for a vehicle in accordance with the invention represents an improvement as compared to conventional friction pad carriers. In particular, the carrier 44 facilitates the use of alignment pins 28, 30 for aligning the carrier 44 relative to the anchor plate 24 and inhibiting relative movement of the carrier 44 and the anchor plate 24. By inhibiting relative movement between the carrier 44 and the anchor plate 24, the alignment of the guide pins 68 on which the caliper 50 moves is maintained thereby inhibiting degradation in the performance of the brake 26 and potentially reducing maintenance costs. The configuration of carrier 44 and alignment pins 28, 30 also help to facilitate assembly of the brake 26 onto the anchor plate 24 and may also allow for a reduction in the number, size or required strength of the fasteners 38 joining carrier 44 and anchor plate 24.

While the invention has been shown and described with reference to one or more particular embodiments thereof, it will be understood by those of skill in the art that various changes and modifications can be made without departing from the spirit and scope of the invention.

What is claimed is:

1. A friction pad carrier for a disc brake for a vehicle, comprising:
   a frame defining a central aperture configured to receive an arcuate portion of a rotor that is configured for rotation about a rotational axis, the frame configured for mounting first and second friction pads on opposite sides of the rotor and further defining
      a first lug proximate one end of the frame and defining a first fastener bore, the first fastener bore configured for alignment with a corresponding first fastener bore in an anchor plate mounted on an axle of the vehicle and configured to receive a first fastener for coupling the frame to the anchor plate at a first interface disposed within a plane; and,
      a second lug proximate another end of the frame and defining a second fastener bore, the second fastener bore configured for alignment with a corresponding second fastener bore in the anchor plate and configured to receive a second fastener for coupling the frame to the anchor plate at a second interface disposed within the plane;
   wherein the first fastener and the second fastener permit an amount of surge movement between the frame and the anchor plate within the plane in a direction parallel to the rotational axis, an amount of sway movement between the frame and the anchor plate within the plane in a direction perpendicular to the surge movement and an amount of yaw movement about an axis perpendicular to the plane;
   wherein the first lug further defines a first alignment pin bore configured for alignment with a corresponding first alignment pin bore in the anchor plate and configured to receive a first alignment pin inhibiting the amount of surge movement and the amount of sway movement and one of the first lug and the second lug defines a second alignment pin bore configured for alignment with a corresponding second alignment pin bore in the anchor plate and configured to receive a second alignment pin inhibiting the amount of yaw movement; and,
   wherein the second alignment pin bore comprises a slotted bore including first and second curved portions opposing one another and first and second flat portions opposing one another, a first end of the first curved portion terminating at a first end of the first flat portion, a second end of the first flat portion terminating at a first end of the second curved portion, a second end of the second curved portion terminating at a first end of the second flat portion, and a second end of the second flat portion terminating at a second end of the first curved portion.

2. The friction pad carrier of claim 1, further comprising the first alignment pin, the first alignment pin press fit within the first alignment pin bore.

3. The friction pad carrier of claim 1 wherein the second lug defines the second alignment pin bore.

4. The friction pad carrier of claim 1 wherein a diameter of the first alignment pin bore is less than a diameter of the second alignment pin bore.

5. The friction pad carrier of claim 1 wherein the first lug defines a third fastener bore spaced from the first fastener bore, the third fastener bore configured for alignment with a corresponding third fastener bore in the anchor plate and configured to receive a third fastener for coupling the frame to the anchor plate, a center axis of the first alignment pin bore disposed further from the rotational axis than a center axis of the first fastener bore, but nearer to the rotational axis than a center axis of the third fastener bore.

6. A disc brake for a vehicle, comprising:
   a friction pad carrier comprising:
      a frame defining a central aperture configured to receive an arcuate portion of a rotor that is configured for rotation about a rotational axis, the frame configured for mounting first and second friction pads on opposite sides of the rotor and further defining
      a first lug proximate one end of the frame and defining a first fastener bore, the first fastener bore configured for alignment with a corresponding first fastener bore in an anchor plate mounted on an axle of the vehicle and configured to receive a first fastener for coupling the frame to the anchor plate at a first interface disposed within a plane; and,
      a second lug proximate another end of the frame and defining a second fastener bore, the second fastener bore configured for alignment with a corresponding second fastener bore in the anchor plate and configured to receive a second fastener for coupling the frame to the anchor plate at a second interface disposed within the plane;

wherein the first fastener and the second fastener permit an amount of surge movement between the frame and the anchor plate within the plane in a direction parallel to the rotational axis, an amount of sway movement between the frame and the anchor plate within the plane in a direction perpendicular to the surge movement and an amount of yaw movement about an axis perpendicular to the plane; and, wherein the first lug further defines a first alignment pin bore configured for alignment with a corresponding first alignment pin bore in the anchor plate and configured to receive a first alignment pin inhibiting the amount of surge movement and the amount of sway movement and one of the first lug and the second lug defines a second alignment pin bore configured for alignment with a corresponding second alignment pin bore in the anchor plate and configured to receive a second alignment pin inhibiting the amount of yaw movement; and, a caliper coupled to the friction pad carrier and configured for movement relative to the friction pad carrier to urge the first friction pad and the second friction pad into engagement with the rotor wherein the second alignment pin bore comprises a slotted bore including first and second curved portions opposing one another and first and second flat portions opposing one another, a first end of the first curved portion terminating at a first end of the first flat portion, a second end of the first flat portion terminating at a first end of the second curved portion, a second end of the second curved portion terminating at a first end of the second flat portion, and a second end of the second flat portion terminating at a second end of the first curved portion.

7. The disk brake of claim 6 wherein the friction pad carrier further comprises the first alignment pin, the first alignment pin press fit within the first alignment pin bore.

8. The disk brake of claim 6 wherein the second lug defines the second alignment pin bore.

9. The disk brake of claim 6 wherein a diameter of the first alignment pin bore is less than a diameter of the second alignment pin bore.

10. The disk brake of claim 6 wherein the first lug defines a third fastener bore spaced from the first fastener bore, the third fastener bore configured for alignment with a corresponding third fastener bore in the anchor plate and configured to receive a third fastener for coupling the frame to the anchor plate, a center axis of the first alignment pin bore disposed further from the rotational axis than a center axis of the first fastener bore, but nearer to the rotational axis than a center axis of the third fastener bore.

11. A disc brake assembly for a vehicle, comprising:
an anchor plate configured for mounting to an axle of the vehicle, the anchor plate defining an aperture through which the axle extends;
a friction pad carrier coupled to the anchor plate, the friction pad carrier comprising
a frame defining a central aperture configured to receive an arcuate portion of a rotor that is configured for rotation about a rotational axis, the frame configured for mounting first and second friction pads on opposite sides of the rotor and further defining
a first lug proximate one end of the frame and defining a first fastener bore, the first fastener bore configured for alignment with a corresponding first fastener bore in the anchor plate and configured to receive a first fastener for coupling the frame to the anchor plate at a first interface disposed within a plane; and,
a second lug proximate another end of the frame and defining a second fastener bore, the second fastener bore configured for alignment with a corresponding second fastener bore in the anchor plate and configured to receive a second fastener for coupling the frame to the anchor plate at a second interface disposed within the plane;

wherein the first fastener and the second fastener permit an amount of surge movement between the frame and the anchor plate within the plane in a direction parallel to the rotational axis, an amount of sway movement between the frame and the anchor plate within the plane in a direction perpendicular to the surge movement and an amount of yaw movement about an axis perpendicular to the plane; and, wherein the first lug further defines a first alignment pin bore configured for alignment with a corresponding first alignment pin bore in the anchor plate and configured to receive a first alignment pin press-fit within the first alignment pin bore of the first lug of the friction pad carrier prior to assembly of the anchor plate and the friction pad carrier and inhibiting, upon assembly of the anchor plate and the friction pad carrier, the amount of surge movement and the amount of sway movement and one of the first lug and the second lug defines a second alignment pin bore configured for alignment with a corresponding second alignment pin bore in the anchor plate and configured to receive a second alignment pin press-fit within the second alignment pin bore of the anchor plate prior to assembly of the anchor plate and the friction pad carrier and inhibiting, upon assembly of the anchor plate and the friction pad carrier, the amount of yaw movement; and, a caliper coupled to the friction pad carrier and configured for movement relative to the friction pad carrier to urge the first friction pad and the second friction pad into engagement with the rotor.

12. The disc brake assembly of claim 11 wherein the second alignment pin bore comprises a slotted bore.

13. The disc brake assembly of claim 11 wherein the second lug defines the second alignment pin bore.

14. The disk brake assembly of claim 11 wherein a diameter of the first alignment pin bore is less than a diameter of the second alignment pin bore.

15. The disc brake assembly of claim 11 wherein the first lug defines a third fastener bore spaced from the first fastener bore, the third fastener bore configured for alignment with a corresponding third fastener bore in the anchor plate and configured to receive a third fastener for coupling the frame to the anchor plate, a center axis of the first alignment pin bore disposed further from the rotational axis than a center axis of the first fastener bore, but nearer to the rotational axis than a center axis of the third fastener bore.

* * * * *